United States Patent [19]
Danley et al.

[11] Patent Number: 5,150,272
[45] Date of Patent: Sep. 22, 1992

[54] STABILIZED ELECTROMAGNETIC LEVITATOR AND METHOD

[75] Inventors: Thomas J. Danley, Highland Park; Charles A. Rey, Naperville, both of Ill.

[73] Assignee: Intersonics Incorporated, Northbrook, Ill.

[21] Appl. No.: 489,372

[22] Filed: Mar. 6, 1990

[51] Int. Cl.$^5$ .............................................. H02N 15/00
[52] U.S. Cl. ..................................... 361/144; 219/7.5; 307/104
[58] Field of Search .................. 219/7.5, 10.67, 121.59; 310/90.5; 361/144; 307/104

[56] References Cited

U.S. PATENT DOCUMENTS

| | | | |
|---|---|---|---|
| 4,420,977 | 12/1983 | Elleman et al. | 310/90.5 |
| 4,565,571 | 1/1986 | Abbaschian | 219/7.5 |
| 4,578,552 | 3/1986 | Mortimer | 219/7.5 |
| 4,896,849 | 1/1990 | Moynihan | 219/7.5 |
| 4,979,182 | 12/1990 | Lohoefer | 219/7.5 |

FOREIGN PATENT DOCUMENTS 3639973  6/1988  Fed. Rep. of Germany.

Primary Examiner—Jeffrey A. Gaffin
Attorney, Agent, or Firm—Juettner Pyle & Lloyd

[57] ABSTRACT

A device for providing electromagnetic levitating forces and heating is described. A plurality of separate coils are provided, each powered by a separate power amplifier. Each coil may be supplied with two separate frequencies, one to levitate, and the other to heat the object. Also, the coils may be driven at separate phases to more uniformly distribute the magnetic levitating and heating forces.

13 Claims, 2 Drawing Sheets

STABILIZED ELECTROMAGNETIC LEVITATOR AND METHOD

BACKGROUND OF THE INVENTION

Electromagnetic levitation involves the use of a radio frequency field acting on a sample having some degree of conductance. The field induces a current in the sample which in turn reacts to repel the inducing field. The field is generated by an alternating current power source connected to specially designed coil, which is fabricated from water cooled copper tubing. The coil is connected to a single RF amplifier, with the coil comprising two connected coaxial portions, with one portion being wound in a direction opposite to the other. The field of one portion is 180 degrees out of phase with the other portion and produces a null point along the axis where the two fields are equal in strength, allowing levitation of a specimen near the null point.

The power required to levitate a sample also causes the sample to be heated to a degree dependent on the eddy currents and hence on the field strength or coil current at a given frequency. Many experiments have been proposed and conducted in which a levitated sample is heated and cooled, for reasons more fully set forth below.

Electromagnetic levitation has traditionally involved numerous problems and tradeoffs, which have not been adequately addressed or resolved by prior art methods. The levitator has involved the use of a single, large and bulky power source, which is connected at some distance from the coil. Due to substantial line losses, most of the power is converted into heat necessitating the use of water cooling to prevent the leads and the coil from melting. As a result, efficiencies of approximately 30% or less are achieved.

The coil configurations of prior art coils have involved compromise. To produce optimum heating, a solenoid-type coil may be employed, but only at the sacrifice of levitation forces. A crossed or opposite phase coil is more efficient for levitation, but the forces available to retain the sample at angles to the axis between the coils is very weak. As a practical matter, it is usually very simple to levitate and melt a sample. When the sample is cooled by a reduction in power, however, the electromagnetic field may not be sufficient to hold the sample in a stabilized levitated position. Also, lack of restraining forces away from the axis may allow a molten sample to escape under the influence of gravity. The positioning and heating capabilities of such devices cannot be independently controlled.

Electromagnetic induction techniques have been used to levitate, position, and melt conductive or metal specimens. Various applications include metal shaping, welding, themophysical property measurements, continuous casting, non-contact supercooling, and melt processing in a containerless environment. The latter is a very important application, since it allows melting of materials which are highly reactive at high temperature, and which would be contaminated by a crucible. High temperatures (4000K) are obtainable and vacuum or inert gas environments can be used to investigate such highly reactive materials.

It would be desirable to provide independent positioning and heating/cooling control in an electromagnetic induction device without the use of separate heating devices. It would also be desirable to provide a levitation device with a more stabilized levitation location, i.e., to equalize the repulsive forces surrounding the levitated specimen and provide enhanced stability and uniformly distribute the flow of eddy currents in the sample. Another objective would be to decrease the size and line losses attributable to present day power supplies, which would result in greatly improved efficiencies, and would eliminate the need for water cooling and the difficult shaping of copper tubing.

SUMMARY OF THE INVENTION

In accordance with a first aspect of the present invention, two separate frequencies are applied to the same coil, one to provide levitation forces and the other to provide heating. For example, a high frequency is used to position the sample, and a lower frequency is used to heat the sample.

In a second aspect of the invention, a plurality of separate coils are employed, preferably in opposed pairs along respective common axes, or coils around individual axes directed toward the area of levitation. Preferably, each coil is powered by its own highly compact, broadband, power amplifier. The use of separate amplifiers results in greater flexibility in control, i.e., independent amplitude and phase controls for each frequency supplied to each coil. The distance from the supply to the coil is reduced, thereby reducing line losses. The conductor lengths of each coil are also reduced, thereby reducing power losses. The efficiency is greatly enhanced, and the need for water cooling may be eliminated or substantially reduced.

A third aspect of the present invention is to employ a plurality of individual coils around the specimen and to drive the coils in different phases so as to more uniformly distribute the magnetic levitating and heating forces. For example, three separate coils or opposed sets of coils could be driven at a 0-120-240degree relationship, which would, in effect, simulate the rotation of the coils around the weak and strong direction and provide a more spherical energy well. In actuality, the peak magnetic field is electrically moved around the specimen to provide a time averaged uniform force in all directions. This may be conveniently accomplished by providing phase controls between the individual power amplifiers for the coils. The phase can also be adjusted to induce rotation in the sample.

Many other advantages and benefits will become apparent from the following specification and claims.

THE DRAWINGS

DESCRIPTION OF THE PREFERRED EMBODIMENTS

Figure 1:
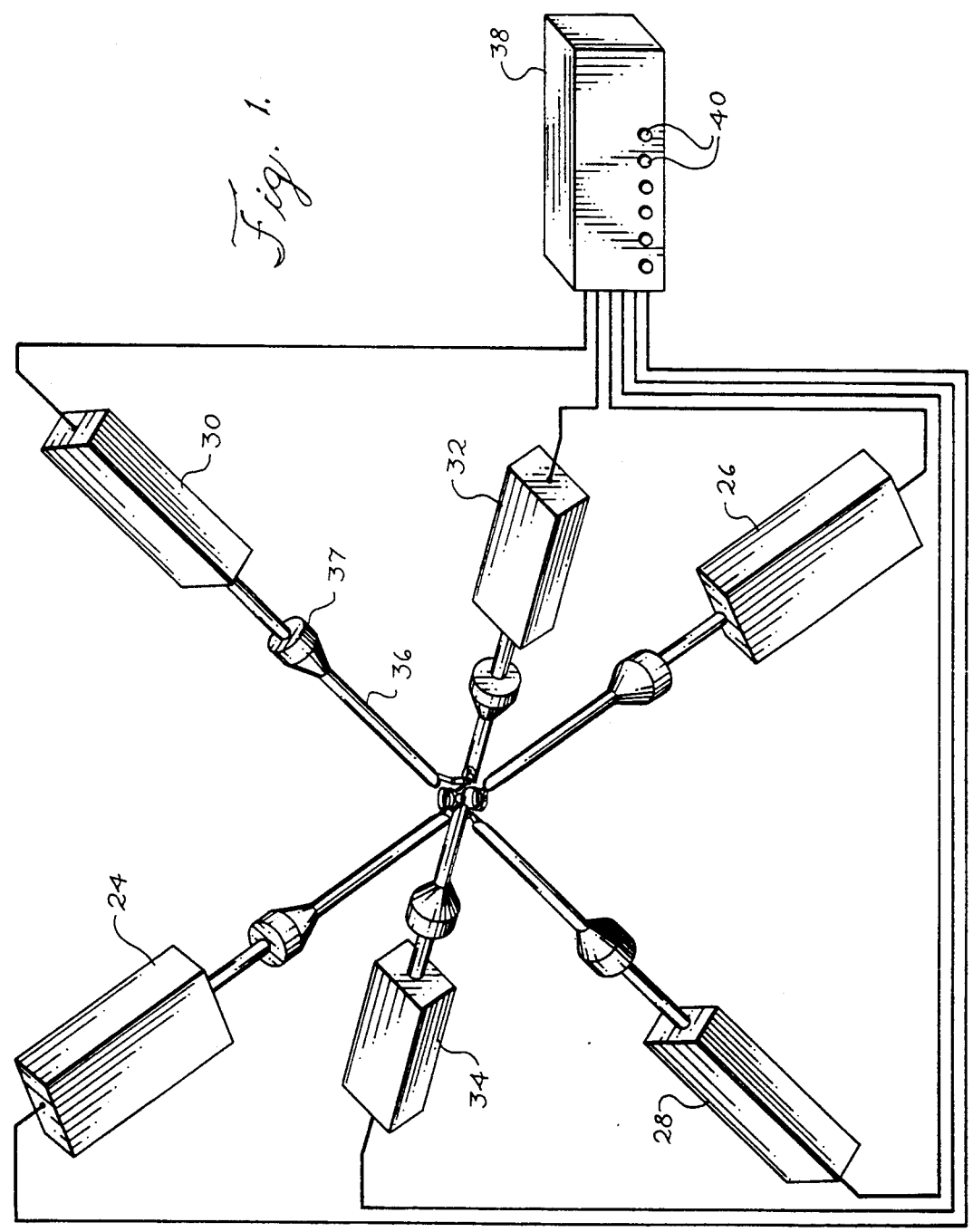
FIG. 1 is a perspective view of the apparatus of the present invention.
Figure 2:
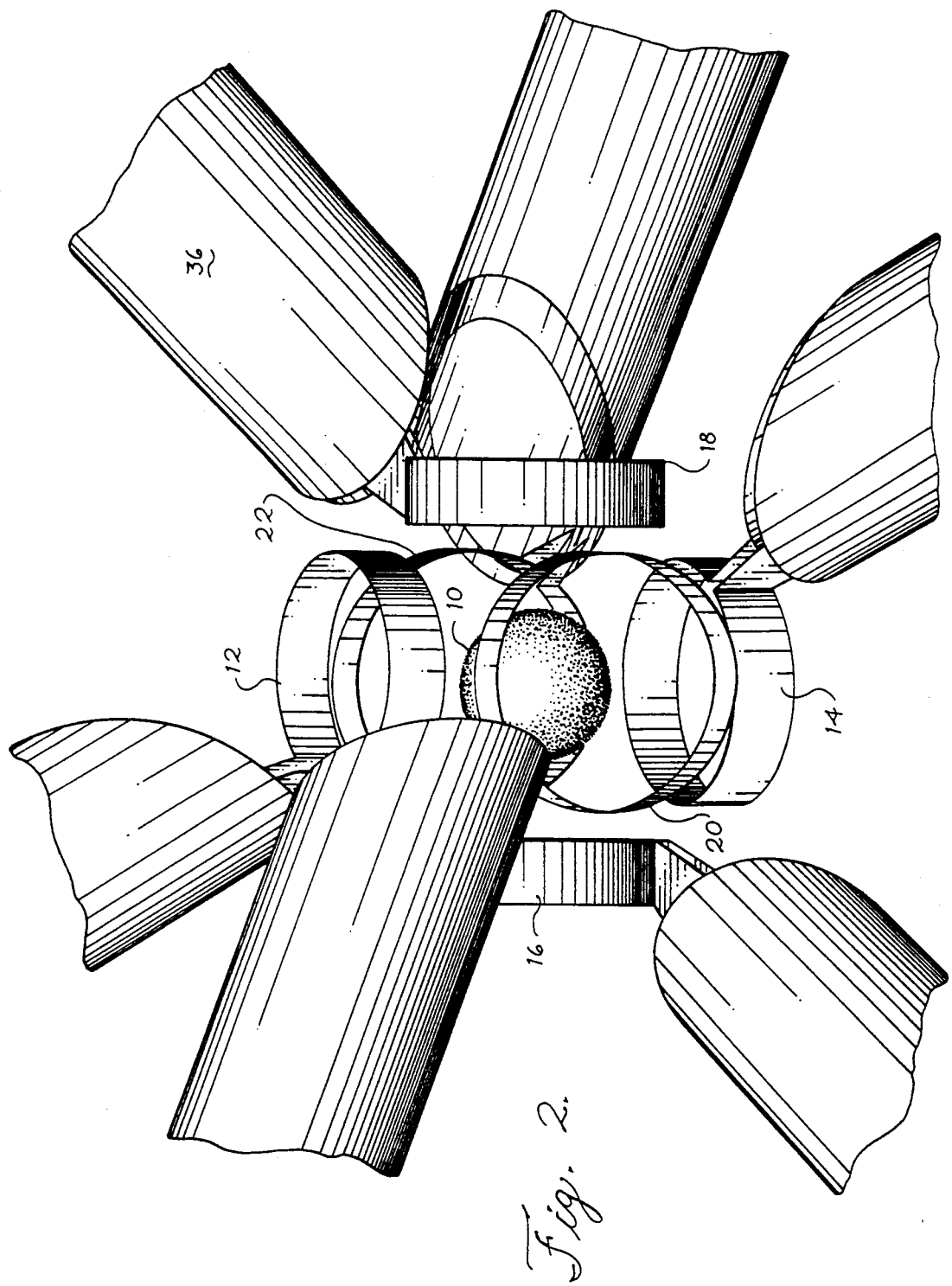
FIG. 2 is a detailed perspective view of a portion of FIG. 1.

The stabilized electromagnetic levitator of the present invention comprises a plurality of coils having less than three turns and preferably one or two turns, with the axis of the coils being disposed around the area in which an object will be levitated. As shown in FIGS. 1 and 2, the coils are arranged in opposed pairs and may be employed along the x, y and z axes around the object 10 to be levitated. The opposed pairs of coils 12 and 14, 16 and 18, and 20 and 22 are in the form of a split circle having an axis, with opposed coils being coaxial. As stated above, other single coil configurations may be employed; the present configuration is shown for the sake of clarity.

Existing levitators employ a single axis coil system. This requires large currents on a single pair of coils with a long connecting loop between opposing coils, whereas in the present invention, the opposed coils are separate and unconnected. As an example of a prior art device, 300 to 400 amperes of current are supplied to the coil system to achieve levitation. It is these large current amplitudes, in combination with the thin skin depth at radio frequencies, that generate excessive heat and necessitate the use of hollow coils and leads and a water cooling system.

In the present invention, a plurality of RF amplifier means is provided for supplying power to the individual coils. Preferably, compact amplifiers such as 24, 26, 28, 30, 32 and 34 are connected to the individual coils 12–22, respectively. The amplifiers are linear wideband solid state power amplifiers in the range of 100 kHz to 100 MHz. The amplifiers use high frequency power transistors that are compact, avoid tuned circuits and help decrease electromagnetic interference. The amplifiers have an efficiency of greater than 60%, which is at least double the efficiency of a conventional amplifier in a conventional system. Since individual amplifiers are employed, the power requirement for each is greatly reduced and is generally less than one kW. Amplifiers of this nature may be constructed using MOSFETS such as MRF153 and MRF154 available from Motorola.

The amplifiers are connected to the coils by power transmission feeds such as 36. Because of the compact arrangement and short lead lines, the feed 36 and coils may be composed of a solid conductor, typically copper, and the need for hollow tubing and water cooling may be eliminated. The power feeds may each include impedance matching transformers 37.

As shown in FIG. 1, the power amplifiers 24–34 are connected by suitable wiring to a common preamplifier 38. The preamplifier has appropriate circuits and controls such as 40 to adjust the amplitude and phase of current applied to each coil. In addition, more than one frequency can be applied to each coil at the same time, with each frequency being adjustable relative to amplitude and phase.

In the preferred embodiment of the present invention, one frequency is supplied to each of the coils to achieve levitation of the sample, and a second frequency is supplied to each coil to provide control of temperature. If the sample is a good conductor, a high frequency may be employed for levitation, and a relatively low frequency may be supplied for heating and cooling. Independent control of these two functions allows for a much wider latitude in processing conditions, which have been inhibited by prior art techniques.

In addition, means are provided to control the relative phase of the current in the coils. This allows for several benefits, but a primary benefit is the use of phase differentials to stabilize the levitated specimen. For example, if the phase of the pair of coils along the x axis is zero, the phase along the y axis may be 120°, and the phase along the z axis may be 40°. the sequential and rapid switching of the relative phase in a uniform manner allows the time-averaged positioning forces to be spherically symmetric, resulting in better stability and quiescence in the levitated object. Rather than adjusting the relative phase between opposed sets of coils, the phase of each individual coil at one or more frequencies can be adjusted to achieve the same or different results.

By making an unequal adjustment in phase and/or amplitude, it is possible to cause unequal forces to be exerted on the object, including rotary, linear and other non-linear forces. These forces may be used, for example, to spin or agitate the sample, or to cause the sample to be ejected from the system.

The use of rapidly varying relative phase shifts at the heating frequency allows for a more uniform heating of the specimen. If the specimen is a good conductor, heating is easily accomplished. In the case of a poor conductor, a secondary source of heat could be applied, such as arc lamps or lasers. Also, because of the compact design, it is more convenient to control the environment around the sample, and facilitates the use of various atmospheres at high or low pressure, or use of vacuum.

We claim

1. A device for stabilized electromagnetic levitation of an object having at least some conductivity, said device comprising a plurality of separate conductive coils located around the object, and power amplifier means for supplying each of the coils with alternating current at more than one frequency simultaneously and at sufficient power to enable levitation of the object between the coils.

2. The device of claim 1 wherein a separate power amplifier means is connected to each of the separate coils.

3. The device of claim 1 wherein said plurality of coils comprises opposed pairs of separate coils located on the x, y and z axes, respectively, relative to said object.

4. The device of claim 1 further comprising means for adjusting the relative phase of the current from said power amplifier means to at least some of said coils.

5. The device of claim 1 further comprising means for adjusting the relative phase of the current from said power amplifier means at said more than one frequency.

6. The device of claim 1 additionally comprising means for adjusting the amplitude of said current.

7. A device for stabilized electromagnetic levitation of an object having a degree of conductivity, said device comprising a plurality of conductive coils disposed uniformly around said object, first means for supplying each of the coils with alternating current at one frequency for levitating the object between the coils, and second means for supplying the coils with alternating current at a second frequency for heating the levitated object.

8. The device of claim 7 wherein the second frequency is lower than said one frequency.

9. A device for stabilized electromagnetic levitation of an object having a degree of conductivity, said device comprising a plurality of separate conductive coils disposed uniformly around the object to be levitated, a separate power amplifier means supplying each coil with alternating current at a given frequency sufficient for levitating said object between said coils, each of said power amplifier means comprising a broadband compact linear RF amplifier located closely adjacent to a respective coil, and conductive means for directly connecting said amplifier to said coil.

10. The device of claim 9 wherein the conductive means is a solid conductor.

11. Method for electromagnetic levitation and heating of an object comprising the steps of creating a plurality of electromagnetic fields at a plurality of separate coils located around said object at a frequency for levitating said object, and creating a electromagnetic field simultaneously in said coils at a second frequency for heating said object.

12. A device for stabilized electromagnetic levitation of an object having a degree of conductivity, said device comprising a plurality of pairs of coils disposed around said object on a plurality of axes, power amplifier means for supplying alternating current to said coils, and means for simultaneously establishing a phase differential between the respective pairs of coils for stabilizing the levitated object.

13. The device of claim 12 wherein pairs of coils are disposed on the x, y and z axes.

* * * * *